United States Patent [19]
Butz

[11] Patent Number: 5,456,036
[45] Date of Patent: Oct. 10, 1995

[54] ANIMAL SCENT DISPENSING PISTOL ASSEMBLY

[76] Inventor: Scott A. Butz, Rte. 1 Box 293-E, Harwood, N. Dak. 58042

[21] Appl. No.: 260,449

[22] Filed: Jun. 14, 1994

[51] Int. Cl.⁶ .................................................. A01M 31/00
[52] U.S. Cl. ................................... 43/1; 124/26; 124/37; 273/418
[58] Field of Search ............................ 43/1; 124/26, 37; 273/418

[56] References Cited

U.S. PATENT DOCUMENTS

| 2,851,991 | 9/1958 | Rink . | |
|---|---|---|---|
| 5,033,446 | 7/1991 | Bradt | 124/26 |
| 5,303,496 | 4/1994 | Kowalkowski | 43/1 |

Primary Examiner—Mark Rosenbaum
Assistant Examiner—Jeanne M. Elpel

[57] ABSTRACT

An animal scent dispensing pistol assembly for dispensing scent for attracting animals comprising a pistol including a barrel having a sealed base end, an opened tip end, and a bored intermediate portion therebetween; a handle extended from the barrel; a plunger slidably disposed within the barrel; a spring mechanism disposed within the barrel and coupled to the pistol for urging the plunger towards the tip end of the barrel; a cocking mechanism coupled to the plunger and adapted to be actuated for urging the plunger towards the base end of the barrel to define a retracted orientation; and a trigger mechanism coupled to the pistol and extended therefrom with the trigger mechanism having a rest position for holding the plunger in the retracted orientation and a firing position actuatable for releasing the plunger from the retracted orientation; and a plurality of scent sticks each adapted for holding liquid scent, each scent stick further adapted to be inserted into the barrel of the pistol for subsequent ejection therefrom.

5 Claims, 3 Drawing Sheets

ANIMAL SCENT DISPENSING PISTOL ASSEMBLY

BACKGROUND OF THE INVENTION

1. Field of the Invention

The present invention relates to an animal scent dispensing pistol assembly and more particularly pertains to dispensing scent for attracting animals with an animal scent dispensing pistol assembly.

2. Description of the Prior Art

The use of scent dispensing apparatuses is known in the prior art. More specifically, scent dispensing apparatuses heretofore devised and utilized for the purpose of dispensing scent are known to consist basically of familiar, expected and obvious structural configurations, notwithstanding the myriad of designs encompassed by the crowded prior art which have been developed for the fulfillment of countless objectives and requirements.

By way of example, U.S. Pat. Des. No. 268,695 to Kolf discloses a deer scent dispenser. U.S. Pat. Des. No. 301,912 to Ward discloses a deer scent holder. U.S. Pat. No. 4,953,763 to Kierum et al. discloses an animal scent dispensing apparatus. U.S. Pat. No. 5,029,408 to Smith discloses a deer attracting device. U.S. Pat. No. 5,060,411 to Uhlman discloses a game luring scent dispensing kit. U.S. Pat. No. 5,161,646 to Aurich et al. discloses an animal attractant scent dispensing device.

While these devices fulfill their respective, particular objective and requirements, the aforementioned patents do not describe an animal scent dispensing pistol assembly that has bullet-like scent sticks adapted to be fired from a pistol for scenting a selected area for attracting game.

In this respect, the animal scent dispensing pistol assembly according to the present invention substantially departs from the conventional concepts and designs of the prior art, and in doing so provides an apparatus primarily developed for the purpose of dispensing scent for attracting animals.

Therefore, it can be appreciated that there exists a continuing need for new and improved animal scent dispensing pistol assembly which can be used for dispensing scent for attracting animals. In this regard, the present invention substantially fulfills this need.

SUMMARY OF THE INVENTION

In the view of the foregoing disadvantages inherent in the known types of scent dispensing apparatuses now present in the prior art, the present invention provides an improved animal scent dispensing pistol assembly. As such, the general purpose of the present invention, which will be described subsequently in greater detail, is to provide a new and improved animal scent dispensing pistol assembly and method which has all the advantages of the prior art and none of the disadvantages.

To attain this, the present invention essentially comprises, in combination, a pistol. The pistol includes two opposed, generally L-shaped, and concave sections coupled together to define a barrel having a sealed base end, an opened tip end, and a bored intermediate portion therebetween, a handle extended outwards from a location near the base end of the barrel and adapted for allowing a firm grip, a slot formed through and aligned with the intermediate portion of the barrel, a trigger hole formed through the intermediate portion of the barrel adjacent to the handle, and an L-shaped channel extended from the trigger hole. The pistol includes a plunger slidably disposed within the barrel with the plunger having a notch formed thereon and a cocking lever extended therefrom and through the slot of the barrel with the cocking lever adapted to be actuated for urging the plunger towards the base end of the barrel to define a retracted orientation. The pistol includes a spring disposed within the barrel between the base end thereof and the plunger with the spring adapted for urging the plunger towards the tip end of the barrel. Lastly, the pistol includes a trigger having a base end pivotally coupled to the barrel, a tip end extended through the trigger hole thereof with the tip end adapted to be pulled towards the handle to define a firing position, a leaf spring extended therefrom and disposed within the channel with the leaf spring adapted for urging the trigger away from the handle to define a rest position, and a latch formed thereon and adapted to be coupled with the notch of the plunger when the cocking lever is placed in the retracted orientation and released from the notch when the trigger is placed in the firing position.

A scent bottle is included and has a container adapted for holding liquid scent therein and a nozzle threadably coupled to the container for dispensing liquid scent therefrom. Six scent sticks are included. Each scent stick is formed of an absorbent material in the shape of a generally cylindrical bullet adapted for holding liquid scent dispensed from the scent bottle. Each scent stick is further adapted to be inserted into the barrel of the pistol and positioned against the plunger. When a scent stick is inserted within the barrel and positioned against the plunger, the cocking lever is placed in the retracted orientation, and the plunger is held in place by the trigger, subsequent placement of the trigger from the rest position into the firing position forces the plunger towards the tip end of the barrel, thus ejecting the scent stick therefrom.

Six hollow stick containers are included. Each stick container has a generally circular bottom wall, a peripheral and tubular side wall extended upwards therefrom to define a well adapted for holding a scent stick therein, and a lid for sealing the well. A pair of gloves is included and adapted for allowing preparation of scent sticks for subsequent ejection from the pistol and dressing of game by hand. Lastly, a rectangular carrying case is included and has a bottom wall with side walls extended upwards therefrom creating a hollow interior with an opening for access thereof, a lid pivotally coupled to a side wall for sealing the opening with the lid having a pouch coupled thereto for receiving and holding the pair of gloves, a generally rectangular block of foam material disposed within the interior having a plurality of apertures formed thereon for receiving and holding the pistol, scent bottle, and stick containers in a stationary configuration, and securement means for allowing the lid to be locked over the opening.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved animal scent dispensing pistol assembly which has all the advantages of the prior art scent dispensing apparatuses and none of the disadvantages.

It is another object of the present invention to provide a new and improved animal scent dispensing pistol assembly which may be easily and efficiently manufactured and marketed.

It is a further object of the present invention to provide a new and improved animal scent dispensing pistol assembly which is of durable and reliable construction.

An even further object of the present invention is to provide a new and improved animal scent dispensing pistol assembly which is susceptible of a low cost of manufacture with regard to both materials and labor, and which accordingly is then susceptible of low prices of sale to the consuming public, thereby making such an animal scent dispensing pistol assembly economically available to the buying public.

Still yet another object of the present invention is to provide a new and improved animal scent dispensing pistol assembly which provides in the apparatuses and methods of the prior art some of the advantages thereof, while simultaneously overcoming some of the disadvantages normally associated therewith.

Even still another object of the present invention is to provide a new and improved animal scent dispensing pistol assembly for dispensing scent for attracting animals.

Lastly, it is an object of the present invention to provide a new and improved animal scent dispensing pistol assembly comprising, in combination, a pistol including a barrel having a sealed base end, an opened tip end, and a bored intermediate portion therebetween; a handle extended outwards from the barrel; a plunger slidably disposed within the barrel; spring means disposed within the barrel and coupled to the pistol for urging the plunger towards the tip end of the barrel; cocking means coupled to the plunger, extended through the pistol, and adapted to be actuated for urging the plunger towards the base end of the barrel to define a retracted orientation; and trigger means coupled to the pistol and extended therefrom with the trigger means having a rest position for holding the plunger in the retracted orientation and a firing position actuatable for releasing the plunger from the retracted orientation; and a plurality of scent sticks each adapted for holding liquid scent, each scent stick further adapted to be inserted into the barrel of the pistol and positioned against the plunger, whereby when a scent stick is disposed within the barrel and positioned against the plunger and the cocking means is placed in the retracted orientation and held in place by the trigger means, subsequent acuatation the trigger means from the rest position to the firing position forces the plunger towards the tip end of the barrel, thus ejecting the scent stick therefrom.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
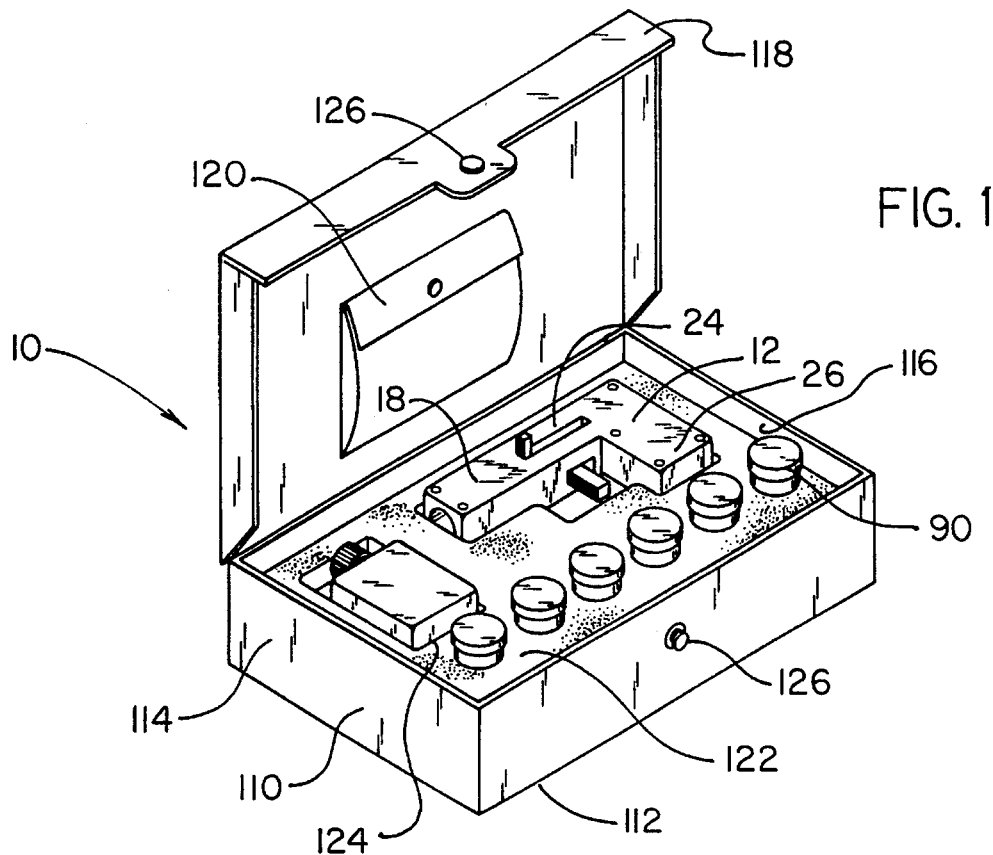
FIG. 1 is a perspective view of the preferred embodiment of the animal scent dispensing pistol assembly constructed in accordance with the principles of the present invention.
Figure 2:
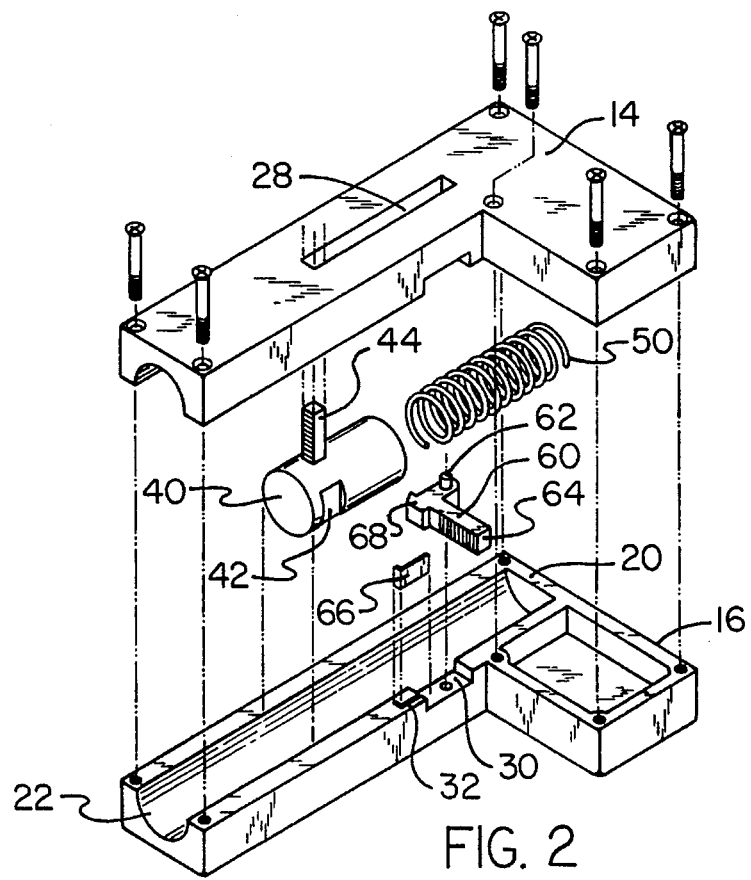
FIG. 2 is an exploded perspective view of the pistol of FIG. 1.
Figure 3:
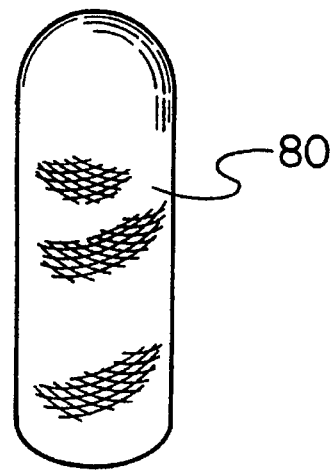
FIG. 3 is a perspective view of the scent stick used for disbursing liquid scent.
Figure 4:
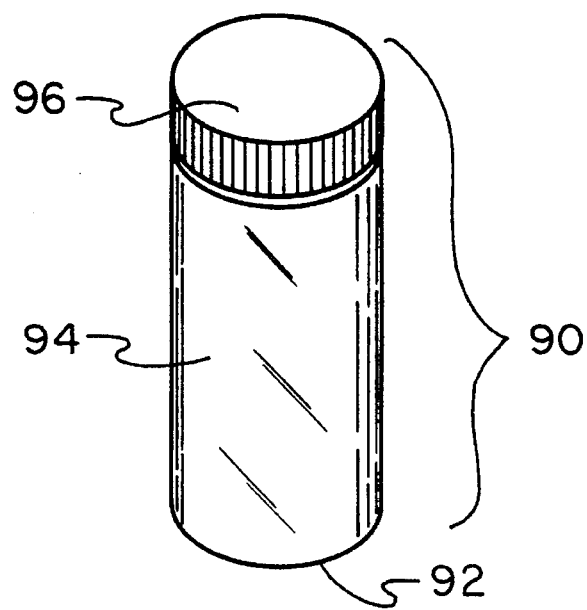
FIG. 4 is a perspective view of a stick container used for holding a scent stick therein.
Figure 5:
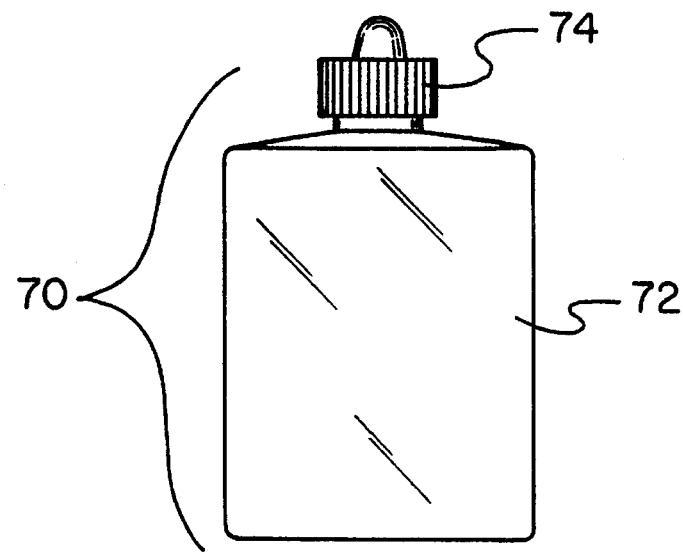
FIG. 5 is a side-elevational view of the scent container used for containing and dispensing liquid scent therefrom.
Figure 6:
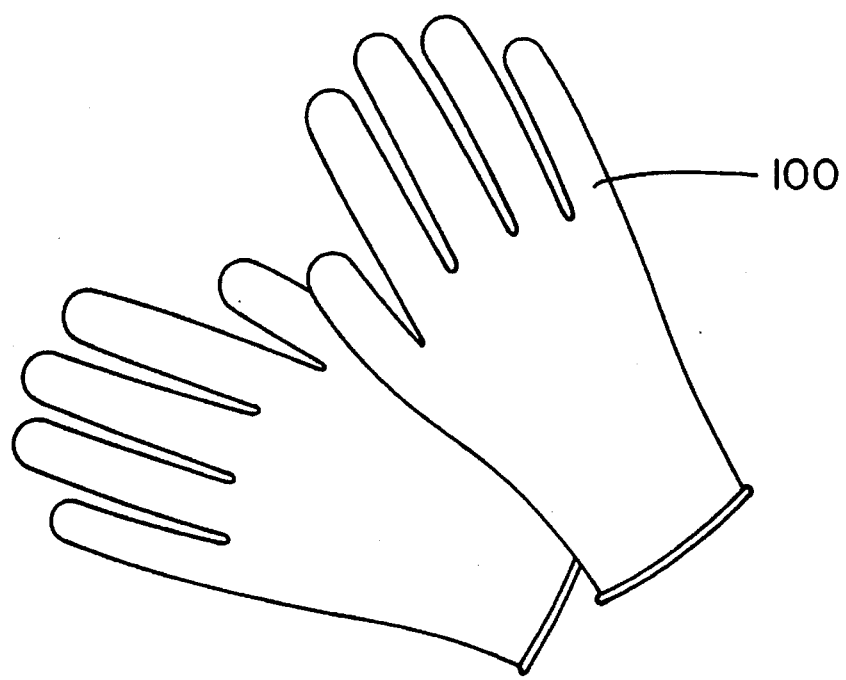
FIG. 6 is a plan view of the gloves used for handling the scent container and scent sticks as well as dressing game.

With reference now to the drawings, and in particular, to FIG. 1 thereof, the preferred embodiment of the new and improved animal scent dispensing pistol assembly embodying the principles and concepts of the present invention and generally designated by the reference number 10 will be described.

Specifically, the present invention includes six major components. The major components are the pistol, scent bottle, scent sticks, stick containers, gloves, and carrying case. These components are interrelated to provide the intended function.

More specifically, it will be noted in the various figures that the first major component is the pistol 12. The pistol is rigid in structure. The pistol is made of a rigid material such as plastic or metal. It is formed of four subcomponents. The subcomponents are the concave sections, plunger, spring, and trigger. These subcomponents are interrelated to allow the pistol to perform its intended function.

The first subcomponents of the pistol are the concave sections 14, 16. The concave sections are generally L-shaped in structure. The two concave sections are coupled together with six threaded screws at each corner thereof to define a barrel, a handle, a slot, a trigger hole, and a channel. The barrel 18 has a sealed base end 20 and an opened tip end 22. A cylindrically bored intermediate portion 24 is extended between the base end and the tip end. The handle 26 extends outwards from a location near the base end of the barrel. The handle is adapted for allowing a user a firm grip. The slot 28 is formed through the intermediate portion of the barrel. The slot is aligned parallel with the axial extent of the bore of the barrel. The trigger hole 30 is formed through the intermediate portion of the barrel adjacent to the handle. The trigger hole is adapted to receive a trigger therein. Lastly, the channel 32 is L-shaped in structure and extended from the trigger hole. The channel is adapted to receive a leaf spring for actuating the trigger.

The second subcomponent of the pistol is the plunger 40. The plunger is essentially cylindrical in structure and disposed within the barrel 18. The plunger has a front end facing the tip end 22 of the barrel and a rear end facing the base end 20 of the barrel. The plunger has a notch 42 formed thereon near its front end. The plunger also has a cocking lever 44 extended therefrom and through the slot 28 of the barrel. The cocking lever is slidable along the length of the slot and adapted to be actuated by a user for urging the plunger towards the base end 20 of the barrel. When the plunger is urged towards the base end of the barrel with the cocking lever, a retracted orientation is defined.

The third subcomponent of the pistol is the spring 50. The spring is coiled in structure and disposed within the barrel between the base end 20 thereof and the plunger 40. The spring is adapted for urging the plunger towards the tip end 22 of the barrel. When the plunger is placed in the retracted orientation, the spring is compressed. The spring is used for supplying the required force needed to propel the plunger within the barrel when the plunger is released from the retracted orientation.

The fourth subcomponent of the pistol is the trigger 60. The trigger has a base end 62. The base end is pivotally coupled to the barrel at the periphery of the trigger hole 30. The trigger also has a tip end 64. The tip end is extended through the trigger hole 30. The tip end is adapted to be pulled towards the handle 26 to define a firing position. The trigger further includes a grip formed thereon for allowing a user a firm hold with a trigger finger. A leaf spring 66 is extended from the trigger and disposed within the channel 32. The leaf spring is adapted for urging the trigger away from the handle to define a rest position. In operation, the leaf spring pulls the trigger back from the firing position to the rest position. The trigger also includes a latch 68 formed thereon between the leaf spring and the base end. The latch is adapted to be coupled with the notch 42 of the plunger when the cocking lever 44 is placed in the retracted orientation. The latch is also adapted to be released from the notch when the trigger is placed in the firing position through the actuation of the trigger by finger of a user.

The second major component is the scent bottle 70. The scent bottle is formed of a generally rigid material such as glass but may also be formed of a generally flexible material such as plastic. The scent bottle includes a container 72 adapted for holding liquid scent therein for attracting animals. The scent bottle may also hold liquid scent therein for repelling animals. These types of liquid scents are either commercially available or custom-made by a user. The scent bottle also includes a sealable nozzle 74. The nozzle is threadably coupled to the container. It is adapted for allowing the liquid scent to be dispensed from the scent bottle.

The third major component is the scent sticks. The present invention includes six scent sticks. Each scent stick 80 is formed of an absorbent material such as cotton, gauze, or a combination thereof. The scent stick is formed in the shape of a generally cylindrical bullet. The absorbent material used to form the bullet is adapted for holding liquid scent dispensed from the scent bottle 70. Each scent stick is adapted to be inserted into the barrel 18 of the pistol. Once inserted, the scent stick is slidable within the barrel. Each scent stick has a rounded tip end and a flat bottom end. The bottom end of the scent stick is adapted to be positioned against the plunger 40.

When a scent stick is inserted within the barrel and positioned against the plunger, the cocking lever 44 is placed in the retracted orientation, and the plunger is held in place by the trigger 60, subsequent placement of the trigger from the rest position into the firing position forces the plunger towards the tip end 22 of the barrel, thus ejecting the scent stick therefrom. Using this type of action, a user is able to aim the pistol in a given direction and fire a scent stick to a desired location for attracting game.

The fourth major component is the stick containers. The present invention includes six hollow stick containers. Each stick container 90 is formed of a clear plastic or other rigid material. Each container has a generally circular bottom wall 92, and a peripheral and tubular side wall 94 extended upwards therefrom to define a well. The well is adapted for holding a scent stick therein. Each container also includes a lid 96 for sealing the well. Thus, scent sticks may be prepared and placed in the containers for subsequent use in the field.

The fifth major component is the pair of gloves 100. The gloves are formed of rubber or other similar polymer-based material. The gloves are adapted for allowing a user to prepare scent sticks for subsequent ejection through the pistol without getting scent on the hands. The gloves may also be utilized for dressing of game by hand.

The sixth major component is the carrying case 110. The carrying case is essentially rectangular in structure. It has a bottom wall 112 with side walls 114 extended upwards therefrom creating a hollow interior with an opening 116 for access therein. A lid 118 is pivotally coupled to a side wall for sealing the opening. The lid has an exterior surface and an interior surface. The lid has a pouch 120 coupled to the interior surface for receiving and holding the pair of gloves 100 through its opening. The pouch also includes a snap and hook coupled thereto for sealing the opening thereof. The carrying case also includes a generally rectangular block of foam material 122. This foam material is disposed within the interior of the carrying case. The foam material has a plurality of apertures 124 formed thereon. Six apertures are formed for receiving the stick containers. One aperture is formed for receiving the scent bottle. The last aperture is formed for receiving the pistol. The apertures hold the pistol, scent bottle, and stick containers in a stationary configuration for transport. The carrying case also includes a securement means 126 in the form of a snap and hook coupled between the lid and a side wall of the case. This securement means allows the lid to be locked over the opening whereby placing the carrying case in a stowed configuration.

The present invention is intended to be utilized by hunters as well as wildlife photographers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An animal scent dispensing pistol assembly for dispensing scent for attracting animals comprising, in combination:

a pistol further comprising:

two opposed, generally L-shaped, and concave sections coupled together to define a barrel having a sealed base end, an opened tip end, and a bored intermediate portion therebetween, a handle extended outwards from a location near the base end of the barrel and adapted for allowing a firm grip, a slot formed through and aligned with the intermediate portion of the barrel, a trigger hole formed through the intermediate portion of the barrel adjacent to the handle, and an L-shaped channel extended from the trigger hole;

a plunger slidably disposed within the barrel, the plunger having a notch formed thereon and a cocking lever extended therefrom and through the slot of the barrel with the cocking lever adapted to be actuated for urging the plunger towards the base end of the barrel to define a retracted orientation;

a spring disposed within the barrel between the base end thereof and the plunger with the spring adapted for urging the plunger towards the tip end of the barrel; and a trigger having a base end pivotally coupled to the barrel, a tip end extended through the trigger hole thereof with the tip end adapted to be pulled towards the handle to define a firing position, a leaf spring extended therefrom and disposed within the channel with the leaf spring adapted for urging the trigger away from the handle to define a rest position, and a latch formed thereon and adapted to be coupled with the notch of the plunger when the cocking lever is placed in the retracted orientation and released from the notch when the trigger is placed in the firing position;

a scent bottle having a container adapted for holding liquid scent therein and a nozzle threadably coupled to the container for dispensing liquid scent therefrom;

six scent sticks, each scent stick formed of an absorbent material in the shape of a generally cylindrical bullet adapted for holding liquid scent dispensed from the scent bottle, each scent stick further adapted to be inserted into the barrel of the pistol and positioned against the plunger, whereby when a scent stick is inserted within the barrel and positioned against the plunger, the cocking lever is placed in the retracted orientation, and the plunger is held in place by the trigger, subsequent placement of the trigger from the rest position into the firing position forces the plunger towards the tip end of the barrel, thus ejecting the scent stick therefrom;

six hollow stick containers, each stick container having a generally circular bottom wall, a peripheral and tubular side wall extended upwards therefrom to define a well adapted for holding a scent stick therein, and a lid for sealing the well;

a pair of gloves adapted for allowing preparation of scent sticks for subsequent ejection from the pistol and dressing of game by hand; and a rectangular carrying case having a bottom wall with side walls extended upwards therefrom creating a hollow interior with an opening for access thereof, a lid pivotally coupled to a side wall for sealing the opening with the lid having a pouch coupled thereto for receiving and holding the pair of gloves, a generally rectangular block of foam material disposed within the interior having a plurality of apertures formed thereon for receiving and holding the pistol, scent bottle, and stick containers in a stationary configuration, and securement means for allowing the lid to be locked over the opening.

2. An animal scent dispensing pistol assembly for dispensing scent for attracting animals comprising, in combination:

a pistol including a barrel having a sealed base end, an opened tip end, and a bored intermediate portion therebetween; a handle extended outwards from the barrel; a plunger slidably disposed within the barrel; spring means disposed within the barrel and coupled to the pistol for urging the plunger towards the tip end of the barrel; cocking means coupled to the plunger, extended through the pistol, and adapted to be actuated for urging the plunger towards the base end of the barrel to define a retracted orientation; and trigger means coupled to the pistol and extended therefrom with the trigger means having a rest position for holding the plunger in the retracted orientation and a firing position actuatable for releasing the plunger from the retracted orientation;

a plurality of scent sticks each adapted for holding liquid scent, each scent stick further adapted to be inserted into the barrel of the pistol and positioned against the plunger, whereby when a scent stick is disposed within the barrel and positioned against the plunger and the cocking means is placed in the retracted orientation and held in place by the trigger means, subsequent actuation of the trigger means from the rest position to the firing position forces the plunger towards the tip end of the barrel, thus ejecting the scent stick therefrom;

a scent bottle for holding liquid scent therein and dispensing liquid scent therefrom; and a plurality of stick containers each adapted for holding a scent stick therein.

3. The animal scent dispensing pistol assembly as set forth in claim 2 further including a pair of gloves adapted for preparing scent sticks for subsequent ejection from the pistol and dressing of game by hand.

4. The animal scent dispensing pistol assembly as set forth in claim 2 further including a carrying case having a hollow interior with an opening for access thereof, a lid coupled thereto for sealing the opening, and a piece of foam material disposed within the interior having a plurality of apertures formed thereon with the apertures formed for receiving and holding the pistol and scent containers in a stationary configuration.

5. The animal scent dispensing pistol assembly as set forth in claim 4 further including securement means for allowing the lid to be locked over the opening of the carrying case.

* * * * *